United States Patent
Shirani et al.

(10) Patent No.: US 9,890,615 B1
(45) Date of Patent: Feb. 13, 2018

(54) CLAMPING SYSTEM HAVING MECHANICAL ADVANTAGE

(71) Applicant: OneSubsea IP UK Limited, London (GB)

(72) Inventors: Alireza Shirani, Houston, TX (US); Marcus Lara, Cypress, TX (US); Tom Polasek, Spring, TX (US); Akshay Kalia, Houston, TX (US)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 15/454,790

(22) Filed: Mar. 9, 2017

(51) Int. Cl.
*E21B 41/00* (2006.01)
*E21B 41/04* (2006.01)

(52) U.S. Cl.
CPC .......... *E21B 41/0007* (2013.01); *E21B 41/04* (2013.01)

(58) Field of Classification Search
CPC ........ E21B 41/0007; E21B 41/04; F16L 3/00; F16L 21/06; F16L 21/065
See application file for complete search history.

(56) References Cited

U.S. PATENT DOCUMENTS

| | | | | |
|---|---|---|---|---|
| 2,913,262 | A * | 11/1959 | De Cenzo | F16L 21/06 277/616 |
| 4,123,095 | A * | 10/1978 | Stehlin | F16L 23/06 24/270 |
| 4,459,930 | A * | 7/1984 | Flory | B63B 22/021 114/230.14 |
| 4,743,056 | A * | 5/1988 | Oliason | B66C 1/422 294/104 |
| 4,902,046 | A * | 2/1990 | Maloberti | F16B 37/0864 285/34 |
| 5,513,228 | A * | 4/1996 | Malmasson | F16L 23/10 24/279 |
| 5,540,465 | A * | 7/1996 | Sisk | F16L 17/04 285/112 |
| 6,116,118 | A * | 9/2000 | Wesch, Jr. | B25B 5/147 81/57.16 |
| 6,499,773 | B1 * | 12/2002 | Ostergaard | F16L 23/08 285/367 |
| 6,971,413 | B2 * | 12/2005 | Taylor | F16L 1/26 138/97 |

(Continued)

FOREIGN PATENT DOCUMENTS

GB 2481991 A * 1/2012 ............ F03C 1/0403

*Primary Examiner* — Matthew R Buck
(74) *Attorney, Agent, or Firm* — Rodney Warfford

(57) ABSTRACT

A technique facilitates clamping operations by providing mechanical advantage. According to an embodiment, a clamping system comprises a clamp having a plurality of clamp segments with surfaces oriented to securely hold and clamp mating features, e.g. mating hubs, of adjacent components. The clamping system also may comprise an actuator coupled to the clamp to enable selective shifting of the clamp between an open position to receive the mating features and a closed position in which the clamp segments are contracted together to secure engagement of those features. A driver is coupled to the actuator to enable movement, e.g. shifting, of the actuator when opening or closing the clamp. The actuator facilitates operation of the driver via, for example, an ROV by providing mechanical advantage and thus increasing the clamping force applied by the clamp to the mating features.

14 Claims, 5 Drawing Sheets

(56) References Cited

U.S. PATENT DOCUMENTS

| | | | | |
|---|---|---|---|---|
| 6,997,645 | B2* | 2/2006 | von Trepka | F16L 1/09 405/169 |
| 8,201,852 | B2* | 6/2012 | Linhorst | F16L 23/06 285/365 |
| 8,465,060 | B2* | 6/2013 | Peet | F16L 23/08 285/407 |
| 8,800,663 | B2* | 8/2014 | Long | E21B 41/04 166/338 |
| 8,832,915 | B2* | 9/2014 | White | E21B 41/04 29/237 |
| 9,091,385 | B2* | 7/2015 | Long | F16L 55/46 |
| 2014/0132000 | A1* | 5/2014 | Ben-Horin | F16K 27/0218 285/373 |

* cited by examiner

CLAMPING SYSTEM HAVING MECHANICAL ADVANTAGE

BACKGROUND

Hydrocarbon fluids such as oil and natural gas are obtained from a subterranean geologic formation, referred to as a reservoir, by drilling a well that penetrates the hydrocarbon-bearing geologic formation. The well may be drilled at the surface or at a subsea location and the flow of fluids may be handled by several different types of equipment. In subsea operations, for example, a variety of subsea components may be disposed on the seabed. Examples of such subsea components comprise subsea wellheads, subsea trees, flowlines, jumpers, and/or various other types of subsea components. The flowlines and jumpers may be coupled to various components via engagement of hubs which are secured together by a clamp. Certain existing clamps may be actuated between open and closed configurations via rotation of a lead screw threadably coupled with adjacent segments of the clamp. Individual lead screws may be rotated by a remotely operated vehicle (ROV) to set the clamp, but limitations exist with respect to the amount of torque which may be applied by the ROV.

SUMMARY

In general, systems and methodologies are described for providing mechanical advantage which facilitates clamping of adjacent components with increased clamping force. According to an embodiment, a clamping system comprises a clamp having a plurality of clamp segments with surfaces oriented to securely hold and clamp mating features, e.g. hubs, of adjacent components. The clamping system also may comprise an actuator coupled to the clamp to enable selective shifting of the clamp between an open position to receive the mating features and a closed position in which the clamp segments are contracted together to secure engagement of the mating features. A driver is coupled to the actuator to enable movement, e.g. shifting, of the actuator when opening or closing the clamp. The driver may be manipulated via, for example, an ROV and the actuator provides mechanical advantage, thus increasing the clamping force applied by the clamp to the mating features.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
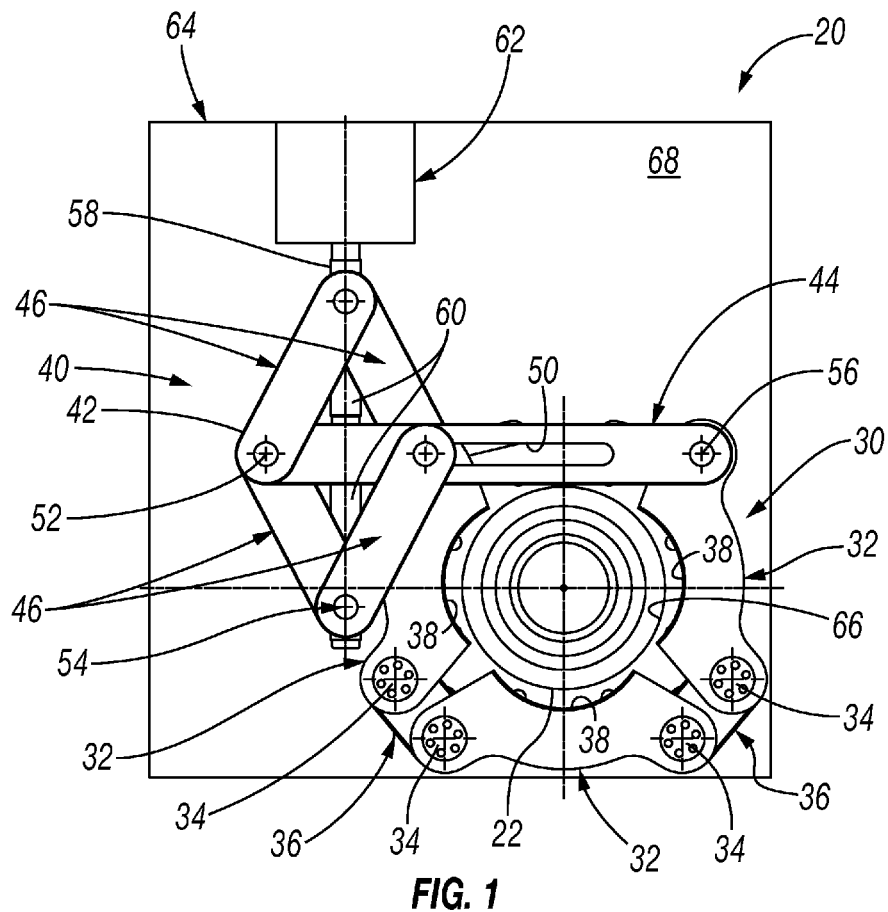
FIG. 1 is a front view of an example of a clamping system in an open position while positioned around mating features, e.g. mating hubs, to be clamped together, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology which facilitate clamping of adjacent components with increased clamping force. The technique utilizes a clamping system constructed to increase mechanical advantage so as to enable a greater clamping force without increasing the power/force rating of tools used to actuate the clamping system. For example, the clamping system is useful in subsea operations for coupling together adjacent subsea components with the aid of a remotely operated vehicle (ROV). Instead of increasing the torque capability of the ROV, for example, the clamping system is able to provide mechanical advantage which effectively increases the clamping force applied to the connection between components without increasing the capability of the ROV. It should be noted this ability to increase mechanical advantage and thus clamping force is useful in a variety of other subsea applications, surface applications, and/or non-well related applications.

According to an embodiment, the clamping system comprises a clamp having a plurality of clamp segments with surfaces oriented to securely hold and clamp mating features, e.g. hubs, of adjacent components. The clamp segments may be expanded to an open position to receive the mating hubs and then actuated to a closed clamping position to securely hold the mating hubs together. In this embodiment, the clamping system further comprises an actuator coupled to the clamp to enable selective shifting of the clamp between the open position to receive the mating features and the closed position in which the clamp segments are contracted against the mating hubs or other mating features.

The clamping system may further comprise a driver coupled to the actuator to enable movement, e.g. shifting, of the actuator when opening or closing the clamp. By way of example, the driver may be combined with an ROV interface to which the ROV may be coupled to provide the desired input for closing or opening the clamp. In some embodiments, the driver may be in the form of a threaded lead screw and the ROV may be engaged with the ROV interface for controlled rotation of the threaded lead screw and thus movement of the actuator. However, the driver may comprise other types of threaded drivers, linear actuators, e.g. hydraulic cylinders, torque tools, or other suitable drivers able to impart the desired motion to the actuator for transitioning the clamp between open and closed positions.

The actuator may be constructed to provide mechanical advantage, thus increasing the clamping force applied by the clamp to the mating features. In other words, the clamping force is substantially higher, e.g. at least three times greater, than would otherwise be available without the mechanical advantage provided by the actuator. For example, the clamping force applied to the clamp via an ROV is substantially higher than it would be with a conventional clamp in which the ROV is engaged with a threaded screw directly engaging sections of the conventional clamp. The mechanical advantage provided by the actuator also helps maintain the size of the lead screw (or other driver) within economically appropriate values. Effectively, the size of the lead screw or other driver may be minimized while providing the desired pretension on the features being clamped.

Referring generally to FIG. 1, an example of a clamping system 20 is illustrated. In this embodiment, the clamping system 20 is illustrated in an open position for receiving mating features 22, 24 of corresponding components 26, 28, respectively, as further illustrated in FIG. 2. By way of example, the corresponding components 26, 28 may comprise a variety of subsea components, such as a flow lines, jumpers, and other subsea components. In certain subsea applications, the clamping system 20 may be used to couple, for example, a flow line or jumper to a corresponding subsea tree, manifold, or various other types of subsea components. In this example, the mating features 22, 24 are in the form of hubs which may be mated together and clamped via clamping system 20 to form the connection between corresponding components 26, 28.

Figure 2:
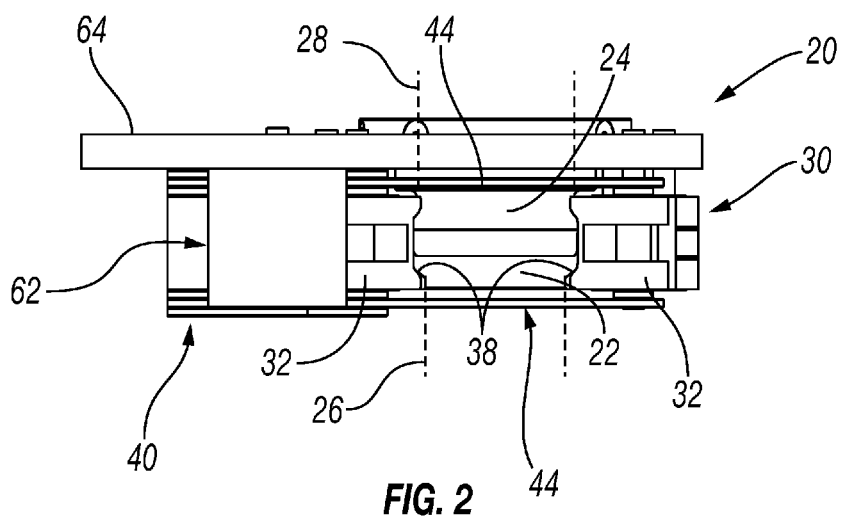
FIG. 2 is a top view of the example illustrated in FIG. 1, according to an embodiment of the disclosure.

In the embodiment illustrated in FIGS. 1 and 2, the clamping system 20 comprises a clamp 30 having a plurality of clamp segments 32 pivotable between operational positions, e.g. open and closed positions. By way of example, the clamp segments 32 may be coupled to each other via pivots 34, e.g. clamp pins, which enable pivotable motion of the clamp segments 32 with respect to each other. In the illustrated embodiment, the clamp segments 32 are pivotably coupled to each other via clamp pins 34 engaged with clamp linkages 36. For example, at least some adjacent pairs of clamp segments 32 may be connected via the corresponding clamp linkage 36 and associated clamp pins 34, as illustrated in FIG. 1.

Figure 3:
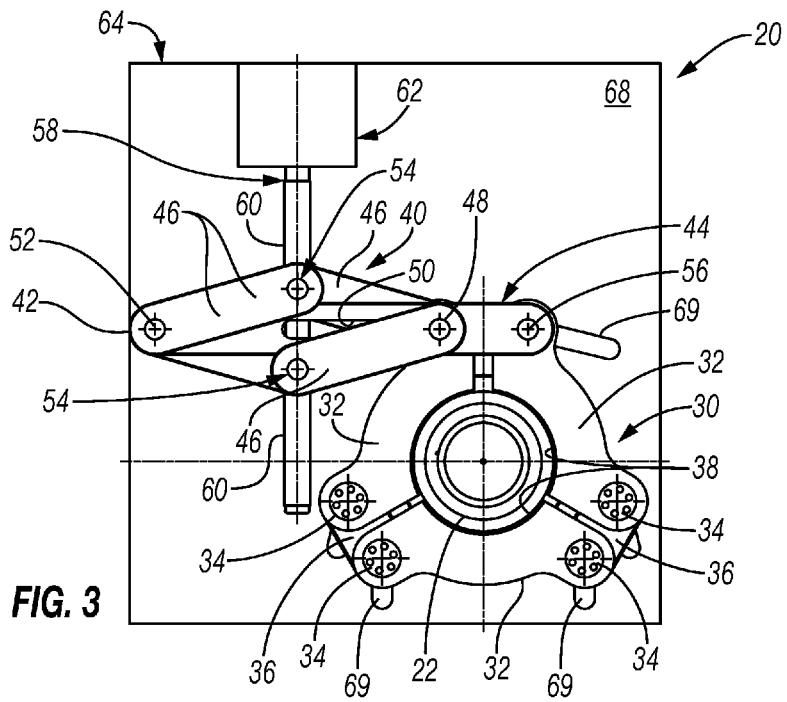
FIG. 3 is an illustration similar to that of FIG. 1 but showing the clamping system actuated to a closed position in which the mating features of adjacent components are securely clamped together, according to an embodiment of the disclosure.
Figure 4:
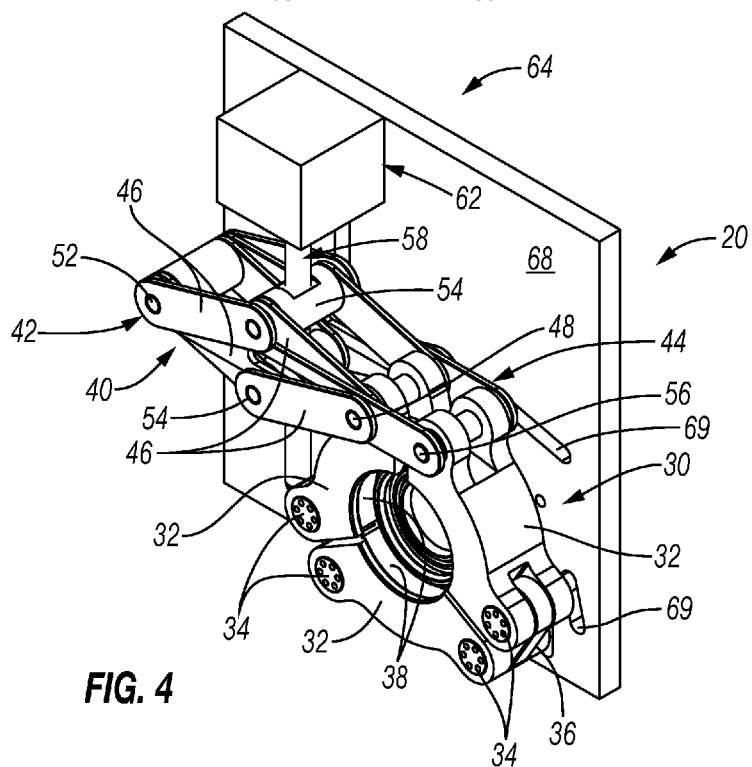
FIG. 4 is an orthogonal view of the clamping system illustrated in FIG. 3 in the closed position, according to an embodiment of the disclosure.

The clamp segments 32 may have interior surfaces 38, e.g. radially inward surfaces, shaped to secure together the mating features 22, 24. In the embodiment illustrated, the mating features 22, 24 are in the form of mating hubs 22, 24 and interior surfaces 38 are shaped to engage and securely force the mating hubs 22, 24 into mating engagement with a desired preload when the clamp 30 and clamp segments 32 are transitioned to the closed, clamping position, as illustrated in FIGS. 3 and 4. As illustrated, the clamp 30 may be transitioned to an open position by pivoting the clamp segments 32 to an expanded configuration able to receive the mating hubs 22, 24 and then closed over the mating hubs 22, 24 to securely couple together corresponding components 26, 28.

According to the embodiment illustrated, the clamping system 20 further comprises an actuator 40. The actuator 40 may have different sizes and configurations which facilitate increased clamping force when clamp 30 is transitioned to the closed position. By way of example, the actuator 40 may comprise a scissor mechanism 42 which manipulates a drive linkage 44. In the illustrated embodiment, the scissor mechanism 42 is oriented to extend and retract drive linkage 44 along an appropriate path for actuation of clamp 30. In some applications, scissor mechanism 42 may comprise a dual scissor mechanism positioned on both sides of clamp 30 as illustrated in FIGS. 2 and 4. Each side of scissor mechanism 42 may drive a separate link of driver linkage 44 as illustrated.

As illustrated, the scissor mechanism 42 may comprise a plurality of scissor links 46 pivotably coupled to each other to form a generally diamond-shaped structure. The scissor links 46 may be pivotably coupled by, for example, a coupling pin 48 by which the scissor mechanism 42 is connected to one of the clamp segments 32. The coupling pin 48 also may be positioned for sliding engagement with drive linkage 44 via a slot or slots 50 formed in drive linkage 44.

Other pivot points between adjacent scissor links 46 may be formed by, for example, a linkage pin 52 and a pair of drive trunnions 54. In this example, the linkage pin 52 also is engaged with drive linkage 44 to force the extension/retraction movement of drive linkage 44 as the scissor mechanism 42 is manipulated between operational positions. The drive linkage 44 also is pivotably coupled with a corresponding clamp segment 32 via a pivot 56, e.g. a pivot pin. Thus, actuation of scissor mechanism 42 selectively forces linkage pin 52 and pivot pin 56 closer together or farther apart to effectively close or open the clamp 30, respectively. It should be noted that due to the pivoting motion of clamp segments 32, the movement of drive linkage 44 may not be purely linear but the extension/retraction movement is suitable for transitioning clamp 30 and clamp segments 32 between operational positions (see, for example, open position in FIG. 1 and closed position in FIG. 3).

The clamping system 20 further comprises a driver 58 coupled with actuator 40 for transitioning the actuator 40 between operational positions. Effectively, the actuator 40 provides mechanical advantage with respect to movement of the driver 58 so as to increase clamping force when actuating clamp 30 without increasing the torque or other force applied to driver 58.

In the embodiment illustrated, driver 58 comprises a threaded lead screw having threaded regions 60 engaged with scissor mechanism 42. For example, the threaded regions 60 may be threadably engaged with corresponding threads in drive trunnions 54. The drive trunnions 54 and corresponding threaded regions 60 may selectively utilize opposed threads, e.g. left-hand threads and right-hand threads respectively, to facilitate transition of the scissor mechanism 42. As the driver/threaded lead screw 58 is rotated to close clamp 30, the opposite threads of threaded regions 60 and/or drive trunnions 54 cause the drive trunnions 54 to move toward each other, as illustrated in FIGS.

3 and 4. This movement, in turn, forces coupling pin 48 and a linkage pin 52 away from each other.

As coupling pin 48 and linkage pin 52 are spread apart, the drive linkage 44 is shifted to move coupling pin 48 and pivot pin 56 toward each other. Because coupling pin 48 and pivot pin 56 are connected to separate clamp segments 32, the clamp segments 32 are transitioned to a contracted position and the clamp 30 is closed, as illustrated in FIGS. 3 and 4. The structure of actuator 40/scissor mechanism 42 working in cooperation with driver 58 provides substantial mechanical advantage, e.g. a mechanical advantage having a factor of three or more, which increases the clamping force exerted by clamp segments 32 against mating hubs 22, 24.

In the example illustrated, the driver 58 is coupled with an ROV interface 62. The ROV interface 62 enables engagement with a torquing tool of an ROV. The ability of actuator 40 to provide mechanical advantage enables use of standard ROVs and smaller threaded lead screws 58 while still providing substantially increased clamping force and the ability for increased preloading of the mating features 22, 24, e.g. mating hubs. In some embodiments, however, the driver 58 may be in the form of a hydraulic driver, e.g. hydraulic cylinder, or other suitable driver operable via an ROV or other appropriate tool.

In some embodiments, the actuator 40 and clamp 30 may be mounted on a support structure 64. For example, some of the pivot pins or other system features may be coupled with support structure 64, and support structure 64 may comprise an opening 66 sized to receive at least one of the hubs 22, 24 to enable coupling of corresponding components 26, 28. By way of example, the support structure 64 may comprise a support plate 68 having opening 66 formed therethrough. Various slots 69 also may be formed through plate 68 to accommodate movement of clamp 30 and/or actuator 40, as illustrated in FIGS. 3 and 4.

Figure 5:
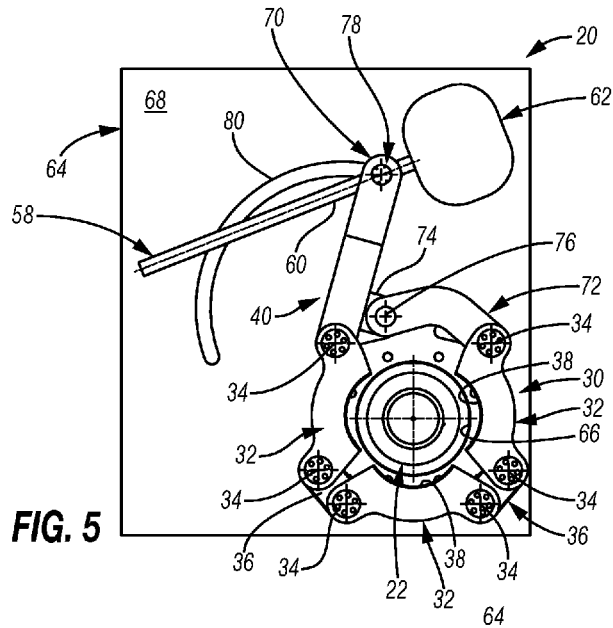
FIG. 5 is a front view of another example of a clamping system in an open position while positioned around mating features, e.g. mating hubs, to be clamped together, according to an embodiment of the disclosure.
Figure 6:
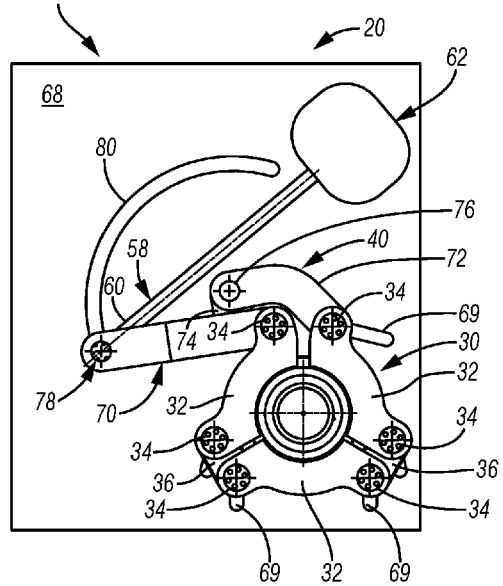
FIG. 6 is an illustration similar to that of FIG. 5 but showing the clamping system actuated to a closed position in which the mating features of adjacent components are securely clamped together, according to an embodiment of the disclosure.
Figure 7:
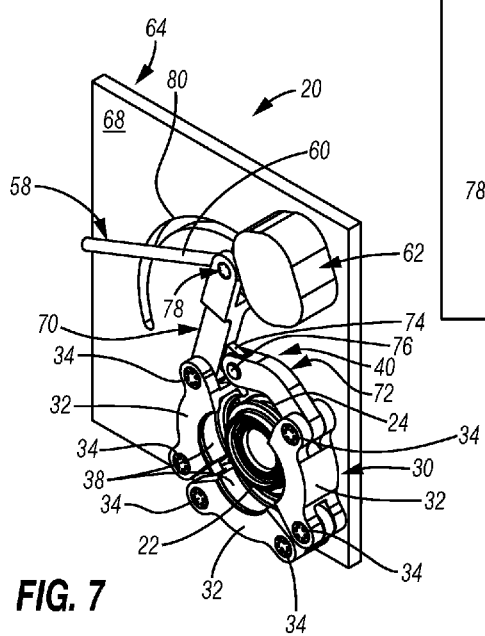
FIG. 7 is an orthogonal view of the clamping system illustrated in FIG. 5 in the open position, according to an embodiment of the disclosure.

Referring generally to FIGS. 5-7, another embodiment of clamping system 20 is illustrated. In this example, several of the components are the same or similar as described with respect to the previous embodiment and have been labeled with the same reference numerals. However, actuator 40 utilizes other components in a different configuration. As illustrated, actuator 40 may comprise a lever 70 pivotably coupled to one of the clamp segments 32 and a break over linkage 72 pivotably coupled to another, e.g. adjacent, clamp segment 32. The lever 70 and the linkage 72 may be joined to the corresponding clamp segments 32 via pivots, e.g. clamp pins 34.

According to an embodiment, the break over linkage 72 also is pivotably coupled with lever 70. For example, one end of the break over linkage 72 may be pivotably coupled with lever 70 via a tab 74, extending laterally from lever 70, and a pivot pin 76. The pivot pin 76 may be located generally at an opposite end of the break over linkage 72 relative to the pivot/clamp pin 34 by which the break over linkage 72 is coupled with the corresponding clamp segment 32. In some embodiments, the break over linkage 72 may be curved in a manner which facilitates locking of the clamp 30 after it is transitioned from the open position (see FIGS. 5 and 7) to the closed position (see FIG. 6).

In this embodiment, the driver 58 may again comprise a threaded lead screw having at least one threaded region 60. The driver 58 may be threadably engaged with lever 70 via a threaded lever trunnion 78. By way of example, the lever trunnion 78 may be disposed on a generally opposite end of lever 70 relative to the pivot/clamp pin 34 connecting the other end of lever 70 to the corresponding clamp segment 32. In some embodiments, the lever trunnion 78 may comprise a pin or other feature which movably secures the lever 70 to support structure 64, e.g. plate 68, for movement along a corresponding arc 80 formed in support structure 64.

As the driver/lead screw 58 is rotated by, for example, an ROV, the end of lever 70 with lever trunnion 78 is moved which, in turn, moves break over linkage 72. Because lever 70 is pivotably coupled to both the corresponding clamp segment 32 and break over linkage 72 while the opposite end of break over linkage 72 is coupled to the adjacent corresponding clamp segment 32, the movement of lever 70 causes transition of clamp 30. For example, as lever 70 is transitioned from the position illustrated in FIG. 5 to the position illustrated in FIG. 6, the relative movement between lever 70 and break over linkage 72 forces a radially contracting movement of clamp segments 32 until clamp 30 is in the closed position illustrated in FIG. 6.

In this example, the curvilinear shape of break over linkage 72 as well as the location of the three corresponding pivots (34, 34, 76) shifts the clamp 30 to the closed position and helps hold or lock the clamp in this closed position. The combination of lever 70 and break over linkage 72 provides substantial mechanical advantage, thus increasing the clamping force applied to mating features 22, 24. The length and shape of lever 70 and break over linkage 72, as well as the arrangement of pivot points, may be changed so as to adjust the mechanical advantage provided by this type of actuator 40. If rotation of the driver/lead screw 58 is reversed, the clamp may be transitioned back to the open configuration illustrated in FIGS. 5 and 7.

As with other embodiments, the driver 58 may be coupled with ROV interface 62. The ROV interface 62 again enables engagement with a torquing tool of an ROV. The ability of this type of actuator 40 to also provide mechanical advantage enables use of standard ROVs and smaller threaded lead screws 58 while still providing substantially increased clamping force and the capability for increased preloading of the mating features 22, 24, e.g. mating hubs. In some embodiments, however, the driver 58 may be in the form of a hydraulic driver, e.g. hydraulic cylinder, or other suitable driver operable via an ROV or other appropriate tool.

Figure 8:
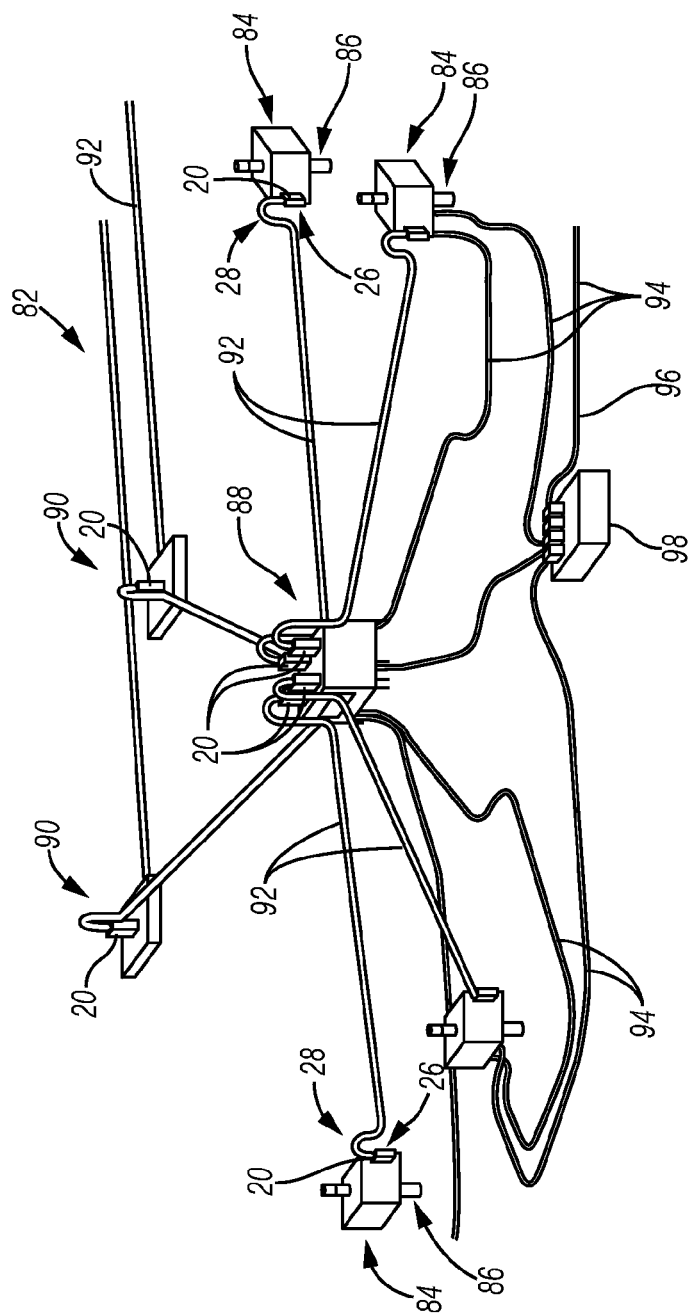
FIG. 8 is an illustration of an example of a subsea well system having various types of subsea components which may be coupled together via embodiments of the clamping system, according to an embodiment of the disclosure.

Referring generally to FIG. 8, an embodiment of a subsea system 82 is illustrated as utilizing numerous clamping systems 20. FIG. 8 is provided as one example of a subsea application in which clamping systems 20 are useful, but the clamping systems 20 may be used in many other types of subsea applications and surface applications. The clamping systems 20 also may be used in various types of well operations as well as non-well operations in which corresponding components are coupled together and clamped with substantially increased clamping force resulting from the mechanical advantage provided by the clamping systems 20.

The subsea system 82 may comprise many types of components 26, 28, such as subsea trees 84 positioned over wellheads 86. Other examples of components 26, 28 include a manifold 88 and one or more pipeline end terminations (PLETs) 90 although many other types of components may be employed in subsea system 82. The components 26, 28 also may comprise flow lines 92, including well jumpers, coupled to various types of other subsea components.

In this example, a pair of connected components, e.g. a flow line 92 coupled to a corresponding subsea tree 84, serve as examples of generic, connected components 26, 28 as described above. However, components 26, 28 may comprise many types of coupled components, including the various flow lines 92 coupled with corresponding components 84, 88, and/or 90 via appropriate hubs 22, 24 which are secured in engagement via clamping systems 20. Depending on the application, various other electrical and hydraulic lines 94 also may be coupled with several of the components and with, for example, an umbilical 96 at a subsea coupling structure 98. The clamping systems 20 may be used for coupling many types of components 26, 28.

By way of example, embodiments of clamping system 20 described above may be used for coupling components 26, 28 as illustrated in FIG. 8. However, various applications may utilize other configurations of clamping system 20 for coupling components 26, 28. One such additional embodiment is illustrated in FIGS. 9 and 10.

Figure 9:
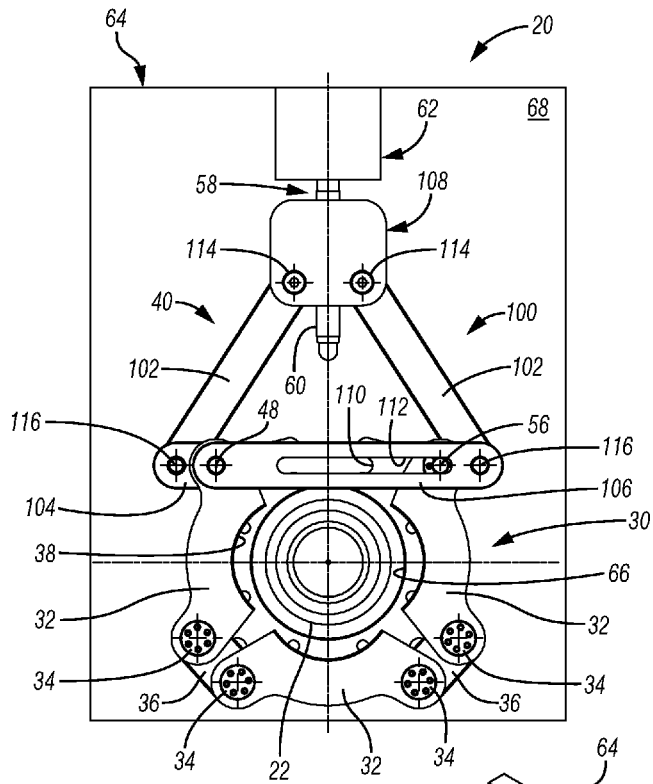
FIG. 9 is a front view of another example of a clamping system in an open position while positioned around mating features, e.g. mating hubs, to be clamped together, according to an embodiment of the disclosure.
Figure 10:
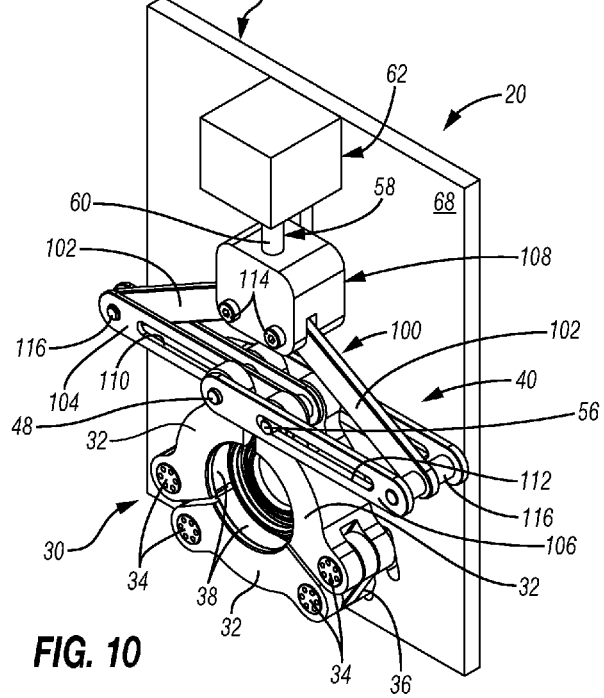
FIG. 10 is an orthogonal view of the clamping system illustrated in FIG. 9 in the closed position, according to an embodiment of the disclosure.

Referring generally to FIG. 9, another example of clamping system 20 is illustrated. In this embodiment, the clamping system 20 is illustrated in an open position for receiving mating features 22, 24 of corresponding components 26, 28. The clamping system 20 again comprises clamp 30 having clamp segments 32 pivotable between operational positions, e.g. open and closed positions. Similar to other embodiments described herein, the clamp segments 32 may have interior surfaces 38, e.g. radially inward surfaces, shaped to secure together the mating features 22, 24, e.g. mating hubs, with a desired preload when the clamp 30 and clamp segments 32 are transitioned to the closed, clamping position (see closed position in FIG. 10).

This embodiment of clamping system 20 also comprises actuator 40 which similarly provides mechanical advantage as described above. As illustrated, actuator 40 may comprise a linkage mechanism 100 which manipulates drive linkages 102 to move driven linkages 104, 106. In the illustrated embodiment, the linkage mechanism 100 is constructed to manipulate drive linkages 102 via a drive component 108, e.g. a drive trunnion block. Movement of the drive linkages 102 causes a desired movement, e.g. lateral movement, of driven linkages 104, 106 so as to selectively close or open the clamp 30. According to an embodiment, the driven linkage 104 may be coupled with coupling pivot pin 56 and the driven linkage 106 may be coupled with coupling pivot pin 48 of clamp 30. To ensure generally lateral motion of driven linkage 104 with respect to driven linkage 106, the coupling pivot pin 48 may be slidably captured in a slot 110 of driven linkage 104 and coupling pivot pin 56 may be slidably captured in a slot 112 of driven linkage 106.

Referring again to FIGS. 9 and 10, this embodiment of clamping system 20 further comprises driver 58 coupled with actuator 40 for transitioning the actuator 40 between operational positions. The driver 58 may be in the form of a threaded lead screw having threaded region 60 engaged with linkage mechanism 100. For example, the threaded region 60 may be threadably engaged with corresponding threads in drive component 108. As the driver/threaded lead screw 58 is rotated to close clamp 30, the drive component 108 is moved along threaded region 60 in a direction toward clamp 30 until the clamp 30 is transitioned to the closed position, as illustrated in FIG. 10.

During operation, when driver/threaded lead screw 58 is rotated in a clamp closing direction via, for example, an ROV, the drive linkages 102 pivot about pivots 114. The drive linkages 102 are pivotably coupled with drive component 108 via pivots 114 and pivotably coupled with driven linkages 104, 106 via pivots 116. The pivoting motion of drive linkages 102 caused by movement of drive component 108 forces the outer ends/outer pivots 116 in a laterally outward direction, as illustrated in FIG. 10. Because the driven linkages 104, 106 are coupled with coupling pivot pins 56, 48 as illustrated, the movement forces clamp 30 to the closed position illustrated in FIG. 10. Reversal of the rotation of driver/threaded lead screw 58 moves the drive component 108 in an opposite direction to thus release clamp 30, as illustrated in FIG. 9. The structure of actuator 40/linkage mechanism 100 working in cooperation with driver 58 provides substantial mechanical advantage, e.g. a mechanical advantage having a factor of three or more, which may be used to increase the clamping force exerted by clamp segments 32 against mating hubs 22, 24.

As with other embodiments described herein, the driver 58 may be coupled with ROV interface 62. The ROV interface 62 enables engagement with a torquing tool of an ROV. The ability of actuator 40 to provide mechanical advantage enables use of standard ROVs and smaller threaded lead screws 58 while still providing substantially increased clamping force and the ability for increased preloading of the mating features 22, 24, e.g. mating hubs. In some embodiments, however, the driver 58 may be in the form of a hydraulic driver, e.g. hydraulic cylinder, torquing tool, or other suitable driver operable via an ROV or other appropriate tool.

Depending on the specifics of a given application, the components of clamping system 20 may vary. Additionally, the clamping system(s) 20 may be used in a variety of subsea applications and other applications to enable secure coupling of corresponding components with enhanced clamping force. The size, shape, and type of components utilized in clamping system 20 may be selected according to the parameters of the operation. For example, the clamping system 20 may utilize various types of actuators, clamp segments, drivers, ROV interfaces, in suitable arrangements. Additionally, the size and configuration of the actuators 40, e.g. lever length, scissor mechanism size, pivot point arrangement, and clamped coupling points, may be selected to achieve the desired mechanical advantage and shifting of clamp segments between operational positions. The mounting structure 64 also may have several configurations to facilitate use of clamping system 20 with many types of components 26, 28 in a variety of environments.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for coupling, comprising:
   a first subsea component having a first hub;
   a second subsea component having a second hub engaged with the first hub; and
   a clamping system securing the first hub and the second hub in engagement, the clamping system comprising:
      a clamp having a plurality of clamp segments pivotable between an open position to receive the first and second hubs and a closed position holding the first and second hubs in engagement with each other;
      an actuator coupled to the clamp to actuate the clamp between the open position and the closed position;
      a lead screw coupled to the actuator, the actuator providing a mechanical advantage when the lead screw is rotated to manipulate the actuator so as to actuate the clamp; and
      a remotely operated vehicle (ROV) interface coupled to the lead screw, wherein the actuator comprises a scissor mechanism coupled to the lead screw and to a drive linkage, the drive linkage moving to actuate the clamp as the scissor mechanism is shifted via rotation of the lead screw.

2. The system as recited in claim 1, wherein the scissor mechanism and the drive linkage are each coupled to a separate one of the clamp segments of the clamp.

3. The system as recited in claim 1, wherein the clamp segments are pivotably mounted with respect to each other via clamp pins, the clamp pins being coupled with clamp links extending between adjacent clamp segments.

4. The system as recited in claim 1, wherein the clamp is mounted to a support structure having an opening for receiving at least one of the first hub and the second hub.

5. The system as recited in claim 4, wherein the support structure comprises a support plate.

6. The system as recited in claim 1, wherein the actuator enables at least three times greater clamping force compared to using the lead screw alone when actuating the clamp segments.

7. A system, comprising:
a clamp having a plurality of clamp segments with radially inward surfaces shaped to secure mating hubs together, the clamp segments being pivotably coupled to each other;
an actuator coupled to the clamp to selectively shift the clamp between an open position in which the clamp segments are expanded apart and a closed position in which the clamp segments are contracted together to enable securing of the engagement between the mating hubs; and
a driver coupled to the actuator to move the actuator when opening or closing the clamp, the actuator providing mechanical advantage relative to the driver alone so as to increase clamping force when the clamp is actuated to the closed position, wherein the driver comprises a lead screw and the actuator comprises a lever coupled to the lead screw and to a break over linkage, the lever being pivoted via rotation of the lead screw to actuate the clamp.

8. The system as recited in claim 7, further comprising an ROV interface coupled to the lead screw.

9. The system as recited in claim 7, wherein the mating hubs comprise a first hub of a first subsea component and a second hub of a second subsea component engaged with the first hub.

10. A system, comprising:
a first subsea component having a first hub;
a second subsea component having a second hub engaged with the first hub; and
a clamping system securing the first hub and the second hub in engagement, the clamping system comprising:
a clamp having a plurality of clamp segments pivotable between an open position to receive the first and second hubs and a closed position holding the first and second hubs in engagement with each other;
an actuator coupled to the clamp to actuate the clamp between the open position and the closed position; and
a lead screw coupled to the actuator, the actuator providing a mechanical advantage when the lead screw is rotated to manipulate the actuator so as to actuate the clamp, wherein the actuator comprises a linkage mechanism having drive linkages and driven linkages, the drive linkages being moved by the lead screw to, in turn, move the driven linkages in opposite directions with respect to each other as the clamp is actuated between the open position and the closed position.

11. The system as recited in claim 10, wherein closing the clamp comprises rotating the lead screw with an ROV.

12. The system as recited in claim 10, further comprising an ROV interface coupled to the lead screw.

13. The system as recited in claim 10, wherein the clamp segments are pivotably mounted with respect to each other via clamp pins, the clamp pins being coupled with clamp links extending between adjacent clamp segments.

14. The system as recited in claim 10, wherein the clamp is mounted to a support structure having an opening for receiving at least one of the first hub and the second hub.

\* \* \* \* \*